United States Patent [19]
Ohnishi et al.

[11] Patent Number: 5,424,150
[45] Date of Patent: Jun. 13, 1995

[54] POLYMERIC SOLID ELECTROLYTE

[75] Inventors: Toshihiro Ohnishi; Shuji Doi, both of Tsukuba; Sumio Hara, Sodegaura, all of Japan

[73] Assignee: Sumitomo Chemical Company, Ltd., Osaka, Japan

[21] Appl. No.: 202,675

[22] Filed: Feb. 25, 1994

Related U.S. Application Data

[63] Continuation of Ser. No. 985,919, Dec. 4, 1992, abandoned.

[51] Int. Cl.$^6$ .............................. H01M 6/18
[52] U.S. Cl. .................... 429/192; 429/213; 252/62.2; 252/182.1; 525/61
[58] Field of Search ............... 429/33, 192, 213; 252/62.2, 182.1; 525/61

[56] References Cited

U.S. PATENT DOCUMENTS

| | | |
|---|---|---|
| 2,434,179 | 1/1948 | Sharkey . |
| 4,999,263 | 3/1991 | Kabata et al. . |
| 5,041,346 | 8/1991 | Giles .................... 429/192 |
| 5,292,803 | 3/1994 | Ohmae et al. . |

FOREIGN PATENT DOCUMENTS

| | | |
|---|---|---|
| 0434011 | 6/1991 | European Pat. Off. . |
| 0502420 | 9/1992 | European Pat. Off. . |
| 62-139266 | 6/1987 | Japan . |
| 3227307 | 10/1991 | Japan . |

OTHER PUBLICATIONS

Patent Abstracts of Japan, vol. 14, No. 236, May 18, 1990, JP-A-26 0 925.
Database WPI, Derwent Publications Ltd., AN 90-087441, JP-A-2 040 867, Feb. 9, 1990.
Database WPI, Derwent Publications Ltd., AN 76-00990X, JP-A-50 112 494, Sep. 3, 1975.
Database WPI, Derwent Publications Ltd., AN 93-031719(04), JP-A-4 359 051, Dec. 11, 1992.
*Journal of Polymer Science*, Polymer Physics Edition, vol. 17, 645-654, 1979.
*Kobunshi Ronbunshu*, vol. 36, No. 7, pp. 489-494, 1979. (An English-language Abstract is attached).
*Polymers for Advanced Technologies*, vol. 2, pp. 213-217, 1991.

*Primary Examiner*—Vasu S. Jagannathan
*Attorney, Agent, or Firm*—Sughrue, Mion, Zinn, Macpeak & Seas

[57] ABSTRACT

A polymeric solid electrolyte comprising a high molecular compound and a salt wherein the high molecular compound is a product formed by graft-polymerizing an alkylene oxide to the saponification product of a copolymer of ethylene with a vinyl ester of an aliphatic carboxylic acid. The polymeric solid electrolyte has a high ionic conductivity of $10^{-5}$ S/cm or more even at a temperature of 30° C., shows a low temperature dependency of ionic conductivity and thus can be used as the solid electrolyte of various electrochemical devices such as batteries.

4 Claims, No Drawings

POLYMERIC SOLID ELECTROLYTE

This is a continuation of application Ser. No. 07/985,919, filed Dec. 4, 1992, now abandoned.

BACKGROUND OF THE INVENTION

1. Field of the Invention

The present invention relates to a polymeric solid electrolyte.

2. Related Art

In recent years, solid electrolytes are attracting attention to obtain various electrochemical devices in the form of solid. Solid electrolytes known previously include polyethylene oxide (hereinafter referred to as PEO), vinyl polymers having PEO in the side chain and polymeric solid electrolytes formed by addition of a salt to siloxane polymers. Further, a solid electrolyte has been proposed which is obtained by impregnating a crosslinked polymer having a high ionic conductivity with an electrolyte solution.

However, the above-mentioned polymeric solid electrolytes comprising PEO have a glass transition temperature not lower than room temperature; they do not always have a sufficiently high ionic conductivity in the neighborhood of room temperature, and mostly have an insufficient flexibility. Therefore, solid electrolytes of this kind which have a high ionic conductivity at low temperatures and have a satisfactory mechanical strength have been awaited. Vinyl polymers having PEO in the side chain have a problem in attaining a low-cost commercial production, because a vinyl monomer having PEO must be synthesized therefor. In the solid electrolyte obtained by impregnation with an electrolyte solution, such problems as liquid spill, etc. have been pointed out.

SUMMARY OF THE INVENTION

In view of such circumstances, the present inventors have made extensive study on polymeric solid electrolytes and resultantly found that a polymeric solid electrolyte formed by adding a salt to a specific high molecular compound shows an excellent ionic conductivity even in the neighborhood of room temperature. Thus, the present invention has been attained.

The object of the present invention is to provide a polymeric solid electrolyte which has a high ionic conductivity even in the neighborhood of room temperature and can be applied to various electrochemical devices, such as batteries.

According to the present invention, there is provided a polymeric solid electrolyte comprising a high molecular compound and a salt wherein the high molecular compound is a product formed by graft-polymerizing an alkylene oxide to the saponification product of a copolymer of ethylene with a vinyl ester of an aliphatic carboxylic acid (said graft-polymerization product being hereinafter referred to as EVA-AO).

DETAILED DESCRIPTION OF THE PREFERRED EMBODIMENTS

The present invention is described in detail below.

The method for producing EVA-AO used in the present invention is not particularly limited and may be those known to the art. A generally used method which may be mentioned as an example comprises completely or partially saponifying a copolymer obtained by copolymerizing ethylene with a vinyl ester of an aliphatic carboxylic acid and then graft-polymerizing an alkylene oxide to the vinyl alcohol part of the saponified copolymer.

The vinyl ester of an aliphatic carboxylic acid is preferably the vinyl ester of an aliphatic carboxylic acid of 2–4 carbon atoms, for example, vinyl acetate, vinyl propionate and vinyl butyrate; these esters may also be used in suitable combinations thereof. Most preferred among them is vinyl acetate.

The copolymer of ethylene with the vinyl ester of an aliphatic carboxylic acid used in the present invention may range from a low molecular weight of liquid one to a high molecular weight of solid one. The molar ratio of ethylene to the vinyl ester of an aliphatic carboxylic acid is preferably from 1:2 to 30:1 from the viewpoint of effective introduction of polyethylene oxide chains, and more preferably from 1:1 to 20:1, particularly preferably from 1:1 to 10:1, from the viewpoint of obtaining a high molecular compound having a glass transition temperature lower than room temperature.

Further, unless it is not deleterious to the object of the present invention, such other monomers as ethylenically unsaturated carboxylic acid esters, e.g., methyl acrylate, methyl methacrylate, glycidyl acrylate, glycidyl methacrylate and the like, may be added to the above-mentioned monomers in polymerization according to necessity.

The method for saponification of the ethylene-aliphatic carboxylic acid vinyl ester is also not particularly limited and may be, for example, a generally employed method of saponification using an alkali in the presence of an alcohol.

Various methods of saponification, including saponification in a heterogeneous liquid phase comprising the copolymer and the alcohol, that in an alcoholic solution and that in a dispersion of the copolymer pellets in the alcohol, can be adopted as desired according to the characteristic properties of the ethylene-aliphatic carboxylic acid vinyl ester used which depend on the molecular weight of the copolymer and the content of the aliphatic carboxylic acid vinyl ester.

The saponification rate may change depending also on the content of the aliphatic carboxylic acid vinyl ester in the ethylene-aliphatic carboxylic acid vinyl ester and is not particularly limited, but it is usually in the range of 40–100%, preferably 60–100%.

The method for grafting an alkylene oxide to the saponification product of the ethylene-aliphatic carboxylic acid vinyl ester copolymer (the saponification product being hereinafter referred to as ethylene-vinyl alcohol copolymer) is not particularly limited, but a generally used method is to react an alkylene oxide in the form of gas with the ethylene-vinyl alcohol copolymer.

The alkylene oxide is preferably those of 2–4 carbon atoms. Ethylene oxide and propylene oxide are particularly preferred in view of the fact that the oxygen atoms in the polyalkylene oxide side chain obtained by grafting participate in ionic conduction.

In the grafting, the alkylene oxides may be used each alone or in a combination of two or more thereof. In the latter case, the grafting may be conducted either through the block graft-polymerization method by introducing the respective alkylene oxides successively into the reaction system or through the random graft-polymerization method by introducing them simultaneously.

The amount of the alkylene oxide used is, in terms of molar ratio relative to the vinyl alcohol part in the copolymer, from 1:1 to 100:1, preferably from 3:1 to 50:1, to attain a high ionic conductivity, and more preferably from 3:1 to 15:1 viewed from the point of preventing the by-production of alkylene oxide homopolymer.

The salt used in the present invention is not restricted as to its kind so long as it is capable of producing ions in the polymeric solid electrolyte and of transporting electric charges as a carrier. It is generally an alkali metal salt, alkaline earth metal salt or organic ammonium salt, preferably a lithium salt, sodium salt or potassium salt. The anion species of these salts may be, for example, the perchlorate ion, borofluoride ion, hexafluorophosphate ion, arsenic hexafluoride ion, tetrafluoroborate ion, periodate ion, sulfate ion, halogen ion, nitrate ion, borate ion, p-toluenesulfonate ion, methanesulfonate ion, trifluoromethanesulfonate ion, trifluoroacetate ion, and thiocyanate ion. Preferred among them are perchlorate ion, borofluoride ion, hexafluorophosphate ion, periodate ion and trifluoromethanesulfonate ion. Specifically, lithium borofluoride, lithium perchlorate, lithium trifluoromethanesulfonate, sodium borofluoride, sodium perchlorate and sodium trifluoromethanesulfonate are particularly preferable.

The amount of the salt used in the present invention is not critical so long as it is in the range that permits of uniform incorporation thereof into the high molecular compound. The mixing ratio by weight of the high molecular compound to the salt is usually 99:1 to 50:5, preferably 95:5 to 70:30, though it depends also on the kind of the salt and the amount of oxygen atoms in EVA-AO.

The mixing of EVA-AO with the salt in the present invention may be conducted, for example, by dissolving EVA-AO and the salt in a solvent and then evaporating the solvent, by dissolving the salt into EVA-AO which has been made into the form of liquid by heating to a temperature not lower than its melting point, or by kneading EVA-AO with the salt.

The polymeric solid electrolyte comprising EVA-AO as the main component according to the present invention can be modified in such properties as ionic conductivity and its temperature dependency by incorporating thereinto polyalkylene oxide, particularly PEO. When the content of polyalkylene oxide in the resulting material is high, however, the material does not have satisfactory strength, so that the content is preferably 20% by weight or less.

The present invention will be described in more detail below with reference to Examples, but the invention is in no way limited thereto.

Referential Example

Preparation of ethylene-vinyl acetate copolymer

Ethylene and vinyl acetate were copolymerized in an autoclave in the presence of tertiary butyl peroxy-2-ethylhexanoate as a polymerization initiator and propane as a molecular weight modifier at a pressure of 1400 kg/cm$^2$ and a temperature of 190° C. to obtain an ethylene-vinyl acetate copolymer (hereinafter referred to as EVAc) having a vinyl acetate content of 31% by weight, number average molecular weight of 1800 and softening point of 30° C.

Saponification of EVAc

In a stainless steel autoclave of 700 l volume equipped with a stirrer, distilling-out line and feed line were placed 160 kg of EVAc, 320 kg of methanol and 0.96 kg of sodium hydroxide and allowed to react for 2 hours with stirring and heating at a temperature of 65° C. while keeping the distilling-out line open. Thereafter, the temperature of the reaction system was raised up to 142° C. in the course of 1 hour to expel all of the volatile substances out of the system. The saponification product thus obtained was an ethylene-vinyl alcohol copolymer (hereinafter referred to as EVOH) which was in the form of wax having a melting point of 83° C. and had a saponification rate of 90%.

Addition of ethylene oxide to EVOH

Subsequently, 0.27 kg of potassium hydroxide was added to the saponification product, the temperature was elevated to 180° C., and then ethylene oxide was fed intermittently into the autoclave so as to keep a pressure of 2 kg/cm$^2$; thus, a total of 272 kg of ethylene oxide was fed in the course of 1 hour. At the time when the pressure decreased to 0.4 kg/cm$^2$, the temperature was lowered to 100° C. and the reaction product was taken out to obtain 408 kg of an ethylene oxide graft polymer of the ethylene-vinyl alcohol copolymer (the graft polymer being hereinafter referred to as EVA-EO), which had a melting point of 51° C. and hydroxyl value of 110 mg KOH/g. The EVA-EO obtained above had an average structure of the following Formula 1

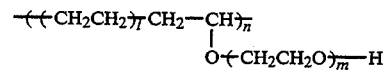

wherein $l = 7$, $m = 10$ and $n = 6$. The EVA-EO contained about 20% by weight of ungrafted PEO and had a number average molecular weight of 2750 as a whole.

EXAMPLE 1

Preparation of polymeric solid electrolyte

In 5 ml of acetone were dissolved 0.850 g of the EVA-EO obtained in Referential Example and 0.150 g of lithium trifluoromethanesulfonate. Then, the acetone was evaporated off under nitrogen stream at normal pressure, and the residue was placed in a measuring cell made of Teflon (0.9 cm × 0.9 cm × 0.1 cm, current collector: platinum plate), then defoamed and dried under vacuum at 80° C. Thereafter, a platinum plate was attached to serve as the counter electrode.

Determination of ionic conductivity

The measuring cell was placed in an electric furnace, and the frequency characteristics of complex impedance were determined while changing the temperature from 30° C. to 100° C., from which the resistance value was determined and ionic conductivity was calculated. The temperature dependency of the ionic conductivity is shown in Table 1.

EXAMPLE 2

A polymeric solid electrolyte was prepared and its ionic conductivity was determined in the same manner as in Example 1 except for using lithium perchlorate as the salt. The results obtained are shown in Table 1.

EXAMPLE 3

The EVA-AO obtained in Referential Example was purified by salting-out technique to remove ungrafted PEO. That is, the EVA-AO was first stirred together with a 20% by weight aqueous sodium chloride solution, then the mixture was allowed to stand to separate into two layers, and the lower layer was discarded. The remainder was dried, then dissolved in toluene to recover the upper layer, which was then concentrated. The EVA-AO thus obtained had a number average molecular weight of 4240.

In the same manner as in Example 1, a polymeric solid electrolyte was prepared and the temperature dependency of its ionic conductivity was obtained. The results are shown in Table 1.

TABLE 1

| Temperature | Ionic conductivity (S/cm) | | |
|---|---|---|---|
| (°C.) | Example 1 | Example 2 | Example 3 |
| 30 | $1.11 \times 10^{-5}$ | $1.11 \times 10^{-5}$ | $1.41 \times 10^{-5}$ |
| 40 | $2.34 \times 10^{-5}$ | $1.78 \times 10^{-5}$ | $2.72 \times 10^{-5}$ |
| 50 | $4.20 \times 10^{-5}$ | $4.71 \times 10^{-5}$ | $5.34 \times 10^{-5}$ |
| 60 | $6.97 \times 10^{-5}$ | $9.96 \times 10^{-5}$ | $8.76 \times 10^{-5}$ |
| 70 | $1.07 \times 10^{-4}$ | $1.58 \times 10^{-4}$ | $1.28 \times 10^{-4}$ |
| 80 | $1.39 \times 10^{-4}$ | $2.65 \times 10^{-4}$ | $1.65 \times 10^{-4}$ |
| 90 | $1.82 \times 10^{-4}$ | $4.05 \times 10^{-4}$ | $2.15 \times 10^{-4}$ |
| 100 | $2.18 \times 10^{-4}$ | $5.82 \times 10^{-4}$ | $2.64 \times 10^{-4}$ |

According to the present invention, by using as the main component of a polymeric solid electrolyte a high molecular compound formed by graft-polymerizing an alkylene oxide to the saponification product of an ethylene-aliphatic carboxylic acid vinyl ester copolymer, a polymeric solid electrolyte which has a high ionic conductivity of $10^{-5}$ S/cm or more even at a temperature of 30° C. and shows a low temperature dependency of ionic conductivity is obtained. The polymeric solid electrolyte can be used as the solid electrolyte of various electrochemical devices such as batteries.

What is claimed is:

1. A polymeric solid electrolyte consisting of a high molecular compound, an alkali metal perchlorate, and up to 20% by weight of a polyalkylene oxide, wherein the high molecular compound is a product formed by graft-polymerizing ethylene oxide or propylene oxide to a saponification product of a copolymer of ethylene with a vinyl ester of an aliphatic carboxylic acid; and, wherein, (a) the ethylene oxide or propylene oxide and the vinyl alcohol portion of the saponified copolymer are in a molar ratio of 1:1 to 100:1, and (b) the ethylene and the vinyl ester of the aliphatic carboxylic acid are in a molar ratio of 1:2 to 30:1.

2. The polymeric solid electrolyte according to claim 1, wherein the high molecular compound is a product formed by graft-polymerizing ethylene oxide to the saponification product of an ethylene-vinyl acetate copolymer.

3. The polymeric solid electrolyte according to claim 1, wherein the mixing ratio by weight of the high molecular compound to the alkali metal perchlorate is from 99:1 to 50:50.

4. The polymeric solid electrolyte according to claim 1, wherein the mixing ratio by weight of the high molecular compound to the alkali metal perchlorate is from 95:5 to 70:30.

* * * * *